US009914453B2

(12) United States Patent
Kraehling

(10) Patent No.: US 9,914,453 B2
(45) Date of Patent: Mar. 13, 2018

(54) METHOD FOR PREDICTING THE TRAVEL PATH OF A MOTOR VEHICLE AND PREDICTION APPARATUS

(71) Applicant: VALEO Schalter und Sensoren GmbH, Bietigheim-Bissingen (DE)

(72) Inventor: Martin Kraehling, Hamburg (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 15/035,253

(22) PCT Filed: Oct. 2, 2014

(86) PCT No.: PCT/EP2014/071168
§ 371 (c)(1),
(2) Date: May 9, 2016

(87) PCT Pub. No.: WO2015/071024
PCT Pub. Date: May 21, 2015

(65) Prior Publication Data
US 2016/0288787 A1     Oct. 6, 2016

(30) Foreign Application Priority Data

Nov. 12, 2013   (DE) ........................ 10 2013 018 967

(51) Int. Cl.
    *B60W 30/095*      (2012.01)
(52) U.S. Cl.
    CPC ...... *B60W 30/095* (2013.01); *B60W 30/0953* (2013.01); *B60W 2520/00* (2013.01);
(Continued)
(58) Field of Classification Search
    CPC ........... B60W 30/095; B60W 30/0953; B60W 2520/00; B60W 2520/10; B60W 2520/12; B60W 2520/14
See application file for complete search history.

(56) References Cited

U.S. PATENT DOCUMENTS 3,945,593 A  *   3/1976   Schanzer ............. G05D 1/0638
                                                                244/181
5,634,698 A  *   6/1997   Cao ........................ B60T 8/174
                                                                303/146
(Continued)

FOREIGN PATENT DOCUMENTS

DE      102006036363 A1     4/2007
DE      102007047337 A1     5/2008
(Continued)

OTHER PUBLICATIONS

International Search Report issued in corresponding application No. PCT/EP2014/071168 dated Jan. 30, 2015 (4 pages).
(Continued)

*Primary Examiner* — Tuan C To
(74) *Attorney, Agent, or Firm* — Osha Liang LLP

(57) ABSTRACT

A method for predicting the expected travel path of a moving vehicle by numerical integration of a dynamic vehicle model using at least one rotational travel state and at least one longitudinal travel state is disclosed. To provide a prediction of the expected travel path, which does not depend on map information and provides the maximum possible accuracy even for non-steady-state travel states of a vehicle, time-related function rules for the rotational travel state $\phi_{Pre}(t)$ and/or for the longitudinal travel state $v_{Pre}(t)$ are determined, and values for the travel state concerned $\phi_{Pre}$, $v_{Pre}$ are predicted at specific points in time by integration using said function rule $\phi_{Pre}(t)$, $v_{Pre}(t)$. In this process, the time-related function rule of the travel state concerned is determined by obtaining respective (rotational or longitudinal) input variables for at least two time-derivatives of the travel state concerned from measured values.

8 Claims, 4 Drawing Sheets

(52) U.S. Cl.
CPC ..... *B60W 2520/10* (2013.01); *B60W 2520/12* (2013.01); *B60W 2520/14* (2013.01)

(56) References Cited

U.S. PATENT DOCUMENTS

| | | | |
|---|---|---|---|
| 6,002,974 A * | 12/1999 | Schiffmann | B60R 21/01 180/252 |
| 6,584,396 B2 * | 6/2003 | Wetzel | B60G 17/019 180/199 |
| 9,381,916 B1 * | 7/2016 | Zhu | B60W 30/0956 |
| 9,669,828 B2 * | 6/2017 | Caveney | B60W 30/0953 |
| 9,701,245 B2 * | 7/2017 | Green | B60Q 9/008 |
| 9,711,049 B2 * | 7/2017 | Baba | G08G 1/166 |
| 9,744,915 B2 * | 8/2017 | Gokan | G08G 1/166 |
| 2003/0040849 A1 | 2/2003 | Hathout et al. | |
| 2003/0212476 A1 * | 11/2003 | Aanen | B62D 15/02 701/1 |
| 2005/0015184 A1 * | 1/2005 | Michi | B60K 31/0008 701/1 |
| 2005/0234628 A1 * | 10/2005 | Luders | B60T 8/1725 701/80 |
| 2008/0071469 A1 | 3/2008 | Caveney | |
| 2010/0057361 A1 | 3/2010 | Caveney et al. | |
| 2010/0198527 A1 * | 8/2010 | Gouriet | B60G 17/0182 702/33 |
| 2010/0228438 A1 * | 9/2010 | Buerkle | B62D 15/025 701/41 |
| 2011/0046843 A1 | 2/2011 | Caveney | |
| 2014/0240114 A1 * | 8/2014 | Waeller | B60Q 9/008 340/435 |
| 2015/0160653 A1 * | 6/2015 | Cheatham, III | G05D 1/0088 701/23 |
| 2015/0203112 A1 * | 7/2015 | Duncan | B60W 30/095 701/1 |
| 2015/0203113 A1 * | 7/2015 | Duncan | B60W 30/0953 701/1 |
| 2016/0039414 A1 * | 2/2016 | Kawai | H04N 5/3698 701/28 |
| 2016/0059854 A1 * | 3/2016 | Ohsugi | B60W 10/20 701/50 |
| 2017/0269602 A1 * | 9/2017 | Nakamura | G05D 1/0214 |

FOREIGN PATENT DOCUMENTS

| | | | | |
|---|---|---|---|---|
| DE | 102011080922 A1 | 2/2013 | | |
| EP | 2233332 A2 * | 9/2010 | ......... | B60G 17/0162 |
| JP | 09259114 A * | 10/1997 | | |
| JP | 2004157910 A * | 6/2004 | | |

OTHER PUBLICATIONS

Written Opinion of the International Searching Authority issued in corresponding application No. PCT/EP2014/071168 dated Jan. 30, 2015 (8 pages).

German Search Report issued in corresponding application No. 102013018967.5 dated Sep. 23, 2014 (9 pages).

* cited by examiner

METHOD FOR PREDICTING THE TRAVEL PATH OF A MOTOR VEHICLE AND PREDICTION APPARATUS

The invention relates to a method for predicting the expected travel path of a moving motor vehicle according to the preamble of Claim 1. The invention also relates to a prediction apparatus according to Claim 7 for implementing the method.

Predicting the expected travel path of a moving vehicle is vital to numerous driver assistance systems, in particular those driver assistance systems that allow the vehicle to perceive and interpret its surroundings by means of suitably installed sensors. Passive driver assistance systems, for instance forward collision warnings (FCW), provide information to the driver without intervening in the vehicle dynamics. Active systems, however, prevent accidents by intervening in the vehicle dynamics by a control intervention in the engine management system and/or the braking system. Adaptive cruise control (ACC) systems are an example of such driver assistance systems and, as an active system, can not only signal collision warnings and thereby prevent accidents, but can also actively adapt the speed of the vehicle to the traffic situation. In addition, active autonomous emergency braking (AEB) systems require, as an active safety system, as accurate a prediction as possible of the expected travel path of the moving motor vehicle.

US 2011/0046843A1 discloses a method for predicting the expected travel path of a moving vehicle, in which method a yaw rate is determined over a defined prediction period on the basis of sensor information and specified information about the road, and then the further travel path of the vehicle is predicted on the basis of speed and bearing of the vehicle and the estimated yaw rate. The information about the road is provided as map information and comprises the geometry of the road section on which the vehicle is currently travelling. In the known method, the sensor information comprises data from a yaw-rate sensor and a speed sensor for the vehicle and also position information from a suitable vehicle sensor, which information is analysed in conjunction with the specified map information about the road.

In the known method, a dynamic vehicle model is numerically integrated to generate a path prediction. In this process, the dynamic vehicle model uses both the rotational motion state, affected by the angular motion of the vehicle, and the longitudinal motion state, affected by the linear motion of the vehicle. As the rotational motion state, the yaw rate is estimated over the prediction time period, specifically on the basis of a measured vehicle speed and the instantaneous curve radius, which is derived from the specified map material. The vehicle acceleration, which is derived from an accelerometer or from different wheel speeds, is taken into account as the longitudinal motion state. The vehicle acceleration is assumed to be constant over the entire prediction time period.

The known method can predict the expected travel path of a moving motor vehicle only on the basis of carefully ascertained map information, and therefore a huge amount of effort is needed to obtain precise map information. In addition, the map material must be constantly updated in order to take account of changes in the road, for instance caused by roadworks. In particular, however, the known method can provide only a very inaccurate prediction of the expected travel path for non steady-state travel states of the vehicle, for instance when accelerating or cornering. Furthermore, the assumption of a constant acceleration and constant angular velocity to estimate the yaw rate results in only an imprecise approximation, with the result that inaccurate prediction results may be obtained, in particular when entering or leaving a bend. This is because when cornering, the driver of the vehicle usually steers more sharply when entering the turn, so that the curve of travel often has a different radius for entering and for leaving the turn. Thus the assumption that the known method makes of constant motion states over a prediction time period can deliver acceptable prediction results at best when travelling around a bend is steady, which, however, is rarely the case when actually driving around bends. A driver assistance system, which depends on the accuracy of the calculated travel-path prediction, is not able to work properly, however, using inaccurate prediction results.

The present invention addresses the problem of providing a prediction of the expected travel path of a moving motor vehicle, which prediction does not depend on map information and provides the maximum possible accuracy even for non steady-state travel states of the vehicle.

The problem is solved according to the invention by a method for predicting the expected travel path of a moving motor vehicle, which method has the features of Claim 1. The problem is also solved as claimed in Claim 7 by a prediction apparatus for implementing the method.

According to the invention, time-related function rules are defined for the predicted rotational travel state and/or for the predicted longitudinal travel state. A travel state here comprises the instantaneous value of a physical variable that describes the movement of the vehicle. In this sense, the rotational travel state comprises information on the instantaneous angular motion of the vehicle, for instance the bearing angle or the yaw rate of the vehicle, each at a particular instant in time. The longitudinal travel state correspondingly comprises information on the instantaneous linear motion of the vehicle, for instance the speed or the acceleration. The expected values for the travel state concerned are predicted at specific points in time by numerical integration of these function rules.

In order to determine the time-related function rule for the particular predicted travel state (rotational and/or longitudinal travel state), respective input variables (rotational or longitudinal) are obtained from measured values for each of at least two time-derivatives of the travel state concerned. A time-derivative is understood to mean here an instantaneous rate of change. Hence at least the first derivative of the travel state concerned, i.e. the rate of change of the travel state, and the second time-derivative, i.e. the rate of change of the first derivative of the travel state, are taken into account as the input variables. For each travel state, a relationship between the input variables, i.e. the time-derivatives of the particular travel state, is established in linear models of order equal to the number of input variables for the travel state concerned. For instance, in one embodiment of the invention having two input variables per travel state, second-order linear models are formed. For the case in which higher derivatives of the travel state concerned are also taken into account as the input variables, correspondingly higher orders of the linear models are formed. The linear model according to the invention is a dynamic model, which describes the moved system in terms of the rotational movement and in terms of the longitudinal movement over the prediction time period.

According to the invention, a relationship is established between the input variables using specified time constants, wherein a time-related function rule for the variation of an input variable is determined from the linear model. By assuming a linear model, a continuous function rule for expected prediction values of the input variable concerned can be determined with a high degree of accuracy. In a further method step, the time-related function rule for the rotational travel state and/or the longitudinal travel state is determined by analytical integration of the time-related function rules for the variation of an input variable, which rules were derived from the linear model.

The invention is based on the knowledge that the rotational travel state, for instance the yaw rate of the vehicle, used for the travel-path prediction normally changes only in the short term when travelling around a bend, and then decays again rapidly. Travel in a straight line is the norm over longer time periods. In addition, the average vehicle yaw rate over time vanishes when considered over a prolonged period. Likewise when considering longitudinal travel states over a prolonged time period, the vehicle acceleration changes only for a short time during phases of acceleration and deceleration. Again in this case, the acceleration lasts only for a relatively short period of time and then decays again. Such phases of non steady-state travel are usually limited to short time periods and are isolated in time from other phases, because a vehicle can only accelerate for a limited time, and also travelling around a bend is practically always time-limited, i.e. unless travelling in a full circle. A bell-shaped variation over time and also the decaying nature of the travel state (rotational or longitudinal travel state) mean that a linear dynamic model can be assumed, from which is determined according to the invention a continuous function rule for expected prediction values of the input values incorporated in the linear model, i.e. for the expected variation of the input value. This continuous function rule involves a derivative of the variable that describes the travel state and is ultimately used for a numerical integration to determine the travel path prediction. Hence a time-related function rule for the travel state used in the numerical integration can be determined by an analytical integration of the function rule for the expected variation of the derivative of the travel state. Hence a prediction of the travel path is possible that is both accurate and takes account of changes in the travel states during non steady-state operating conditions.

The specified time constants for considering the linear dynamic model are predetermined and are obtained and optimised by trials, for instance. Said predetermined time constants can take into account typical driving behaviour of a driver or can be adjusted to suit additional requirements. In an advantageous embodiment of the invention, the time constants lie in a range of 0.3 s to 15.0 s. Time constants in the region of 0.5 s have proved particularly advantageous.

A prediction apparatus according to the invention for implementing the method according to the invention advantageously comprises a measured-value input for connecting to a vehicle-sensor unit of the vehicle. By means of the connection to the vehicle-sensor unit, the prediction apparatus can be supplied continuously with measured values for the variables used in the travel-path prediction. The vehicle-sensor unit often also supplies other driver assistance systems of the vehicle with the measurement values that they each need, and is equipped with suitable sensors. Thus the prediction apparatus can be operated without sensors that must be installed specifically for predicting the expected travel path, for instance as an add-on module to driver assistance systems such as adaptive cruise control (ACC) systems or autonomous emergency braking (AEB) systems.

In an advantageous embodiment of the invention, the dependent variables obtained using the instantaneous input variables are derived from the linear model and taken into account as weighting factors in determining the time-related function rules. The weighting factors determine both the time-related function rule for expected prediction values for the input variable concerned and the time-related rule that is obtained by integrating said function rule and concerns the rotational or longitudinal predicted travel state. The weighting factors, which result necessarily from the instantaneous input variables, taking into account the specified time constants, are updated whenever a new measured value is acquired, thereby making possible a reliable and very accurate travel-path prediction.

The input variables are derived from the supplied rotational and longitudinal measured values. In this process, measured values can be adopted directly as the required input values or can be used as the basis for estimating the input value. In a preferred embodiment of the invention, measured values are acquired for each of the input variables incorporated in the linear model, i.e. for all the incorporated derivatives of the travel state used for the numerical integration.

In a preferred embodiment of the invention, the speed of the vehicle is used as the longitudinal travel state for the numerical integration, wherein the acceleration and a sudden longitudinal movement, as the input variables for the travel-path prediction, are determined or estimated from measured values. A sudden linear movement means here the rate of change of the acceleration, i.e. the time-derivative of the acceleration. If a relationship is established according to the invention between the acceleration and the sudden linear movement in a second-order linear model, then the variation of the speed of the vehicle can be predicted accurately. In addition to the change in the predicted speed during the time interval under consideration, the speed at the starting point of the travel-path prediction is taken into account and added to the value for the predicted speed. This initial speed is always available from the measured values and can alternatively be determined from the available input variables. The prediction horizon, which is taken into account in the numerical integration, advantageously equals 3 seconds to 5 seconds.

As the predicted rotational travel state, a bearing angle of the vehicle is advantageously used in the numerical integration. A measured yaw rate and a yaw acceleration as the derivative of the measured yaw rate act as input variables to the travel-path prediction, which input variables are related in a linear model. The yaw rate is here the angular velocity of a vehicle about its vertical axis. The yaw rate is preferably determined by a suitable yaw-rate sensor on the vehicle that is part of the vehicle-sensor unit.

In the particularly preferred embodiment of the invention, the speed of the vehicle as the longitudinal travel state, and the bearing angle of the vehicle as the rotational travel state are determined and used in the numerical integration.

Exemplary embodiments of the invention are explained in more detail below, where:

Figure 1:
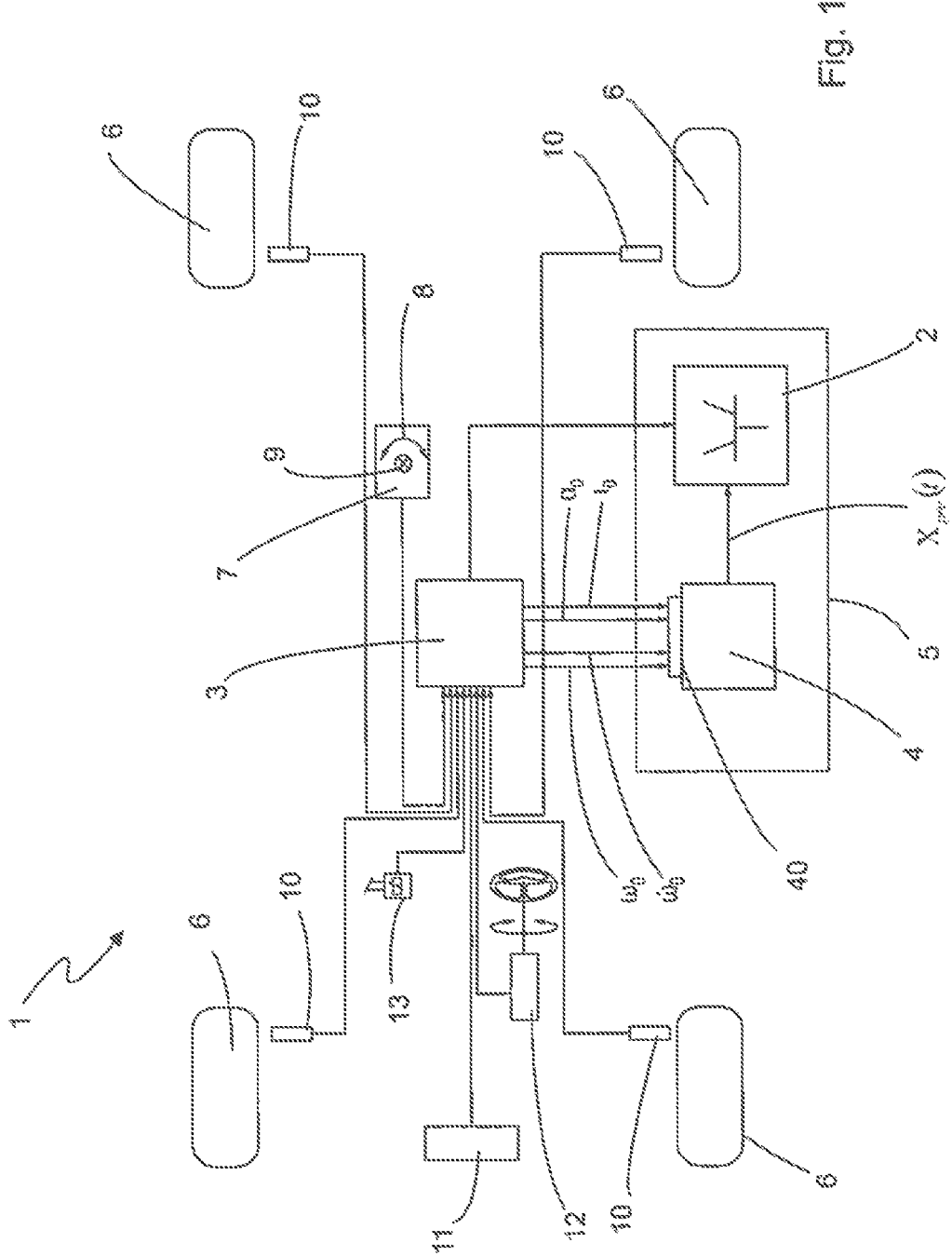
FIG. 1 is a wiring diagram of an exemplary embodiment of a prediction apparatus in a vehicle.

FIG. 1 shows a wiring diagram of a motor vehicle 1 equipped with one or more driver assistance systems. The driver assistance systems comprise a central control unit 2, to which measured information is constantly input from a vehicle-sensor unit 3. The control unit 2 controls those driver assistance systems that rely on the prediction of the expected travel path of the vehicle. For this purpose, the control unit 2 is allocated a prediction apparatus 4, which informs the control unit 2 of its prediction result $X_{pre}(t)$. In the exemplary embodiment shown, the prediction apparatus 4 is a module of the control unit 2 inside a central electronics unit 5.

The control unit 2 uses the input information to analyse the driving behaviour of the vehicle. If the driving behaviour of the vehicle 1 deviates from a target behaviour, a control intervention is made to the brakes of one or more wheels 6 and/or to the engine management system, thereby affecting the drive and, for instance, changing the torque. The driver assistance system that uses the prediction of the expected travel path of the vehicle 1 is an adaptive cruise control (ACC) system, for example. The ACC system also takes into account information transmitted from the vehicle-sensor unit 3 relating to the drive of the vehicle 1 or information from an electronic stability control system, for instance an ESP control system, which is transmitted via a CAN data bus. The control unit 2 converts the accelerations required by the driver assistance system, in this case by the ACC controller, into drive torques and/or braking torques.

The vehicle-sensor unit 3 uses a yaw-rate sensor 7 on the vehicle 1 to detect rotational quantities, which are influenced by the angular motion of the vehicle 1. The yaw-rate sensor 7 here responds to angular movements in the direction of the arrow 8 about a vertical axis 9 of the vehicle 1. Various measured quantities that provide information about the angular motion of the vehicle about the vertical axis 9, i.e. the yaw motion, can be generated from the measured signal from the yaw-rate sensor 7 by time-related analysis.

The vehicle-sensor unit 3 also captures longitudinal measured quantities, which relate to the linear motion of the vehicle 1. Suitable sensors are provided for this purpose. In the exemplary embodiment, revolution counters 10 are arranged on the wheels 6 as sensors for capturing longitudinal measured quantities. The wheel rotation rate or wheel speed can be used to infer the travel speed and other longitudinal values.

The vehicle-sensor unit 3 also comprises an optoelectronic detection device, specifically a laser scanner 11, which in the exemplary embodiment shown is installed in the front region of the vehicle 1. The laser scanner 11 is used to obtain information about the surroundings of the moving motor vehicle 1, for instance obstacles or moving objects such as other vehicles on the road. Different sensor technology can be used instead of a laser scanner 11 to capture visual information, for example as part of a camera-based driver assistance system. If the prediction apparatus 4 is allocated to such a camera-based or optoelectronic driver assistance system, then the camera-based or optoelectronic driver assistance system can take into account the expected travel path of the vehicle in which it is fitted and also the movement of other vehicles to compute suitable control scenarios and trajectories, and respond by making control interventions if necessary.

Figure 2:
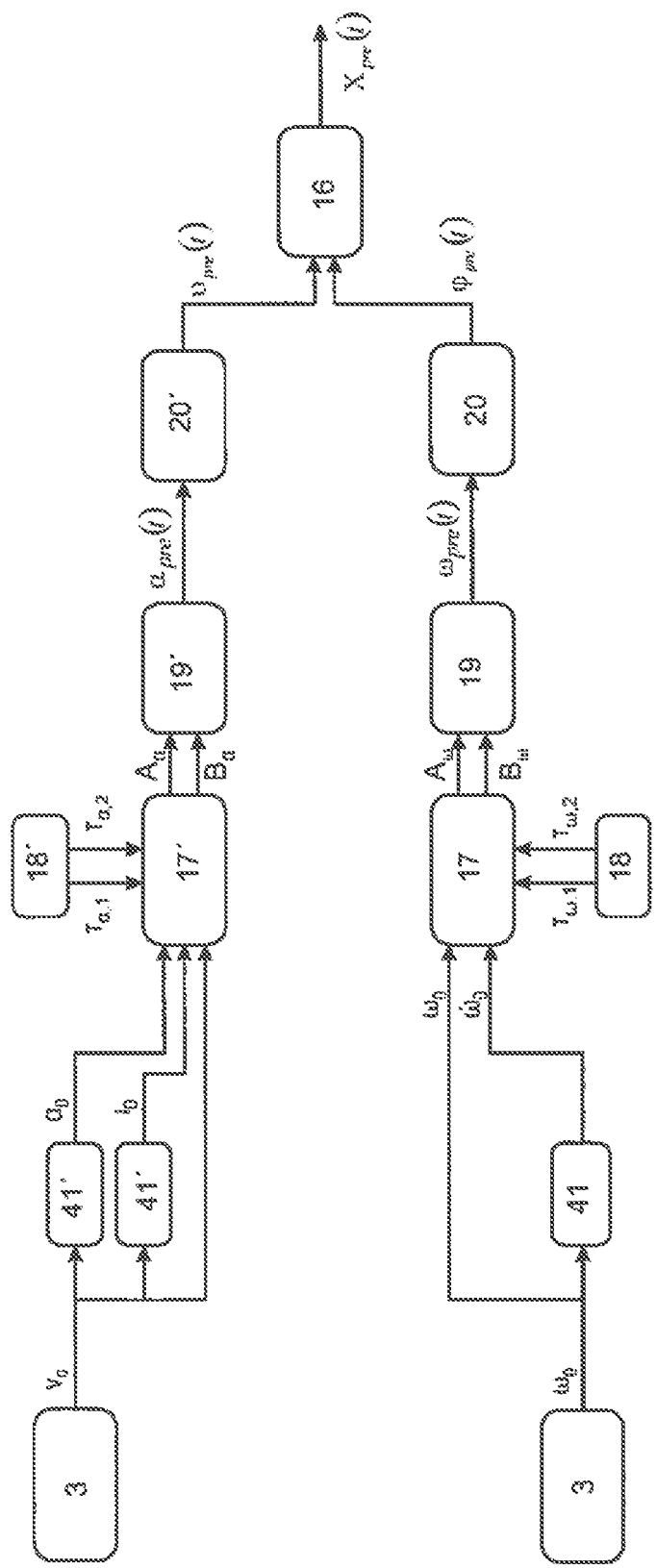
FIG. 2 is a flow diagram of an exemplary embodiment of a method for travel-path prediction.

A measured-value input 40 of the prediction apparatus 4 is connected to the vehicle-sensor unit 3 and receives longitudinal input variables $\alpha_0$, $t_0$ and rotational input variables $\omega_0$, $\dot{\omega}_0$, as explained in greater detail below with reference to FIG. 2.

In the exemplary embodiment shown, the vehicle-sensor unit 3 obtains further measured values, which provide information about the driving behaviour of the vehicle 1, specifically, for example, about those actions coming from the driver of the vehicle. Thus a steering-angle sensor 12 and a braking-signal transducer 13 are part of the vehicle-sensor unit 3. A steering-angle signal from the steering-angle sensor 12, or a brake request via the braking-signal transducer 13, is processed in certain driver assistance systems and can also be included in the travel-path prediction to refine the measured values.

Figure 5:
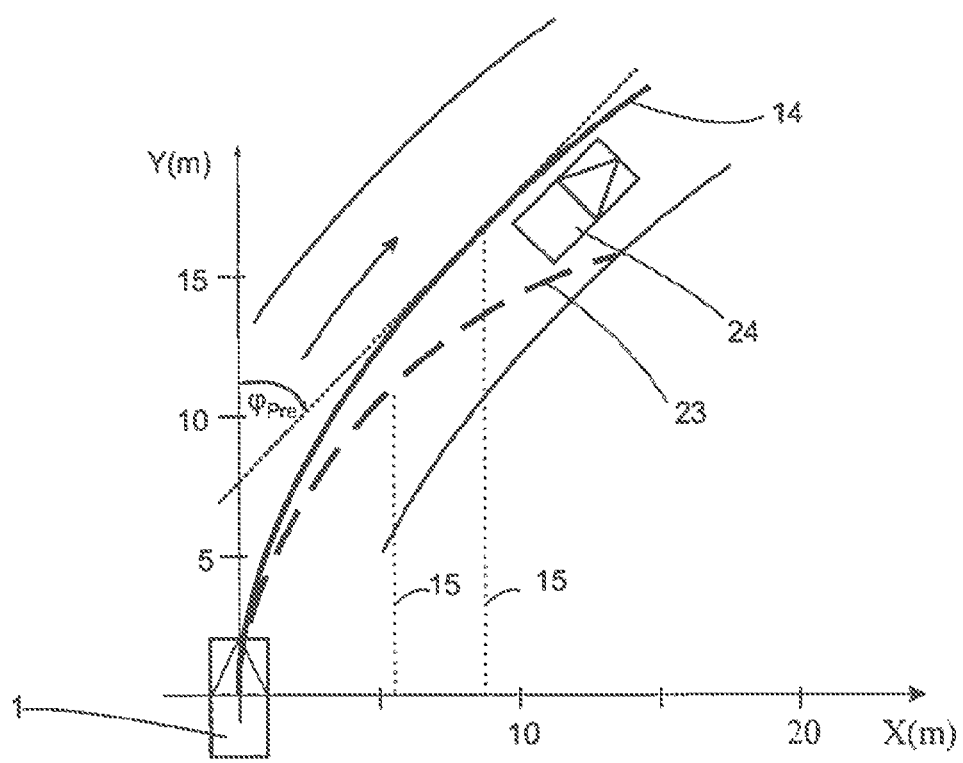
FIG. 5 is a graph showing the predicted travel path of a vehicle.

In predicting the expected travel path of a moving motor vehicle, discrete position values 15 are determined for a prediction horizon of, for example, 3 to 5 seconds at respective points in time lying in the order in which they occur on the expected travel path 14 (FIG. 5).

The calculation of individual prediction positions 15 on the travel path 14 is explained in greater detail below with reference to the flow diagram in FIG. 2. The discrete position values 15 at specific points in time are the prediction result $X_{pre}(t)$ of a numerical integration 16 of a dynamic vehicle model. Both the speed $v_{Pre}$ of the vehicle 1 as the longitudinal travel state and the bearing angle $\phi_{Pre}$ of the vehicle 1 as the rotational travel state are included in this process as given by the following integral:

$$X_{pre}(t) = \int_0^t v_{pre}(\tau) \begin{pmatrix} \cos(\varphi_{pre}(\tau)) \\ \sin(\varphi_{pre}(\tau)) \end{pmatrix} d\tau$$

This integral yields the following approximation for the prediction result as a sum of the positional values 15:

$$X_{pre}(t) \approx \sum_{\kappa=0}^{T/\Delta t} \left[ v_{pre}(\kappa \Delta t) \begin{pmatrix} \cos(\varphi_{pre}(\kappa \Delta t)) \\ \sin(\varphi_{pre}(\kappa \Delta t)) \end{pmatrix} \right]$$

In this equation, $\Delta t$ denotes time-discrete integration steps and T denotes the prediction horizon of preferably 3 to 5 seconds.

In order to determine both the rotational travel state, i.e. the bearing angle $\phi_{Pre}$ of the vehicle 1, and the longitudinal travel state, i.e. the speed $v_{Pre}$, a time-related function rule $\phi_{pre}(t)$ is determined for the bearing angle and a time-related function rule $v_{pre}(t)$ for the speed.

To determine the function rules for the (respective) travel states, initially respective input variables (rotational or longitudinal) $\omega_0$, $\dot{\omega}_0$, $\alpha_0$, $t_0$ are obtained from measured values for at least two time-derivatives of the travel state concerned, and related in a time-discrete manner by time constants $\tau_{\omega,1}$, $\tau_{\omega,2}$, $\tau_{\alpha,1}$, $\tau_{\alpha,2}$ in the linear model of order equal to the number of input variables of the travel state concerned.

To determine the continuous function rule for the rotational travel state, the instantaneous yaw rate $\omega_0$ and the yaw acceleration $\dot{\omega}_0$ are found from measured values from the vehicle-sensor unit 3. In all the equations mentioned below, the index 0 denotes an instantaneous measured value for the corresponding variable. In the exemplary embodiment shown, the instantaneous yaw rate $\omega_0$ is provided as a measured value from the vehicle-sensor unit 3. The instantaneous yaw acceleration $\dot{\omega}_0$ is determined in an estimation stage 41 from the measured values for the yaw rate $\omega_0$. The yaw rate is here the first time-derivative of the bearing angle of the vehicle, and the yaw acceleration is the second time-derivative of the bearing angle, and, in combining step 17, as input variables for the travel-path prediction, are related in a second-order linear model according to the following equation:

$$\begin{pmatrix} \omega_0 \\ \dot{\omega}_0 \end{pmatrix} = \begin{bmatrix} 1 & 1 \\ -1/\tau_{\omega,1} & -1/\tau_{\omega,2} \end{bmatrix} * \begin{pmatrix} A_\omega \\ B_\omega \end{pmatrix}$$

Time constants $\tau_{\omega,1}$, $\tau_{\omega,2}$ are here provided from a specification 18, for instance from a memory element. Said time constants $\tau_{\omega,1}$, $\tau_{\omega,2}$ each lie in a time range of 0.3 s to 15.0 s, preferably approximately 0.5 s.

The dependent variables obtained using the instantaneous input variables, i.e. the instantaneous yaw rate and yaw acceleration, which are measured directly or determined from measured values, are derived from the time-discrete linear model and are taken into account as weighting factors $A_\omega$, $B_\omega$ in determining the time-related function rules:

$$\begin{pmatrix} A_\omega \\ B_\omega \end{pmatrix} = \frac{1}{\tau_{\omega,2}-\tau_{\omega,1}} * \begin{bmatrix} -\tau_{\omega,1} & -\tau_{\omega,1}\tau_{\omega,2} \\ \tau_{\omega,2} & \tau_{\omega,1}\tau_{\omega,2} \end{bmatrix} * \begin{pmatrix} \omega_0 \\ \dot{\omega}_0 \end{pmatrix}$$

The weighting factors $A_\omega$, $B_\omega$ are updated whenever a new measured value is acquired.

In a determination step 19, the instantaneous weighting factors $A_\omega$, $B_\omega$ are used to determine a time-related function rule for the expected variation of an input variable of the linear model. Assuming the linear model, the expected yaw rate $\omega_{pre}(t)$ can be determined as follows as a continuous function rule:

$$\omega_{pre}(t) = A_\omega \exp(-t/\tau_{\omega,1}) + B_\omega \exp(-t/\tau_{\omega,2})$$

The function rule $\omega_{pre}(t)$ for predicting the yaw rate is analytically integrated in an integration step 20 in order to obtain the time-related function rule $\phi_{pre}(t)$ for the bearing angle:

$$\phi_{pre}(t) = A_\omega\tau_{\omega,1}(1-\exp(-t/\tau_{\omega,1})) + B\omega\tau_{\omega,2}(1-\exp(-t/\tau_{\omega,2}))$$

The function rule $\upsilon_{pre}(t)$ for the expected speed of the vehicle is determined in a corresponding manner to determining the function rule for the bearing angle. In the combining step 17', the instantaneous acceleration $\alpha_0$ and the value of an instantaneous sudden linear movement $\iota_0$, which are available from the information from the vehicle-sensor unit 3, are taken into account for this purpose. The input variables of the instantaneous acceleration $\alpha_0$ and of the sudden linear movement $\iota_0$ are determined from the measured values of the instantaneous speed v0 by means of an estimation stage 41'. A relationship between the acceleration and the sudden linear movement, which is the rate of change of the acceleration and hence the second derivative of the speed, is established in a linear model taking into account time constants $\tau_{\alpha,1}$, $\tau_{\alpha,2}$. The specified time constants $\tau_{\alpha,1}$, $\tau_{\alpha,2}$ are taken from a specification 18' as explained above with regard to the rotational travel state. From the second-order linear model for the longitudinal travel state is obtained the following equation for calculating the longitudinal weighting factors $A_\alpha$, $B_\alpha$ for determining the longitudinal travel state:

$$\begin{pmatrix} \alpha_0 \\ \iota_0 \end{pmatrix} = \begin{bmatrix} 1 & 1 \\ -1/\tau_{\alpha,1} & -1/\tau_{\alpha,2} \end{bmatrix} * \begin{pmatrix} A_\alpha \\ B_\alpha \end{pmatrix}$$

The following weighting factors are obtained by rearranging the above equation in a linear system:

$$\begin{pmatrix} A_\alpha \\ B_\alpha \end{pmatrix} = \frac{1}{\tau_{\alpha,2}-\tau_{\alpha,1}} * \begin{bmatrix} -\tau_{\alpha,1} & -\tau_{\alpha,1}\tau_{\alpha,2} \\ \tau_{\alpha,2} & \tau_{\alpha,1}\tau_{\alpha,2} \end{bmatrix} * \begin{pmatrix} \alpha_0 \\ \iota_0 \end{pmatrix}$$

The weighting factors $A_\alpha$, $B_\alpha$ are updated whenever a new measured value is captured.

In a subsequent determination step 19', the weighting factors for the longitudinal travel state are taken into account to obtain a time-related function rule for the expected acceleration according to the following equation:

$$\alpha_{pre}(t) = A_\alpha \exp(-t/\tau_{\alpha,1}) + B_\alpha \exp(-t/\tau_{\alpha,2})$$

The time-related function rule for the expected variation of the linear acceleration is analytically integrated in a subsequent integration step 20, from which is obtained the following equation for the expected speed $\upsilon_{pre}(t)$:

$$\upsilon_{pre}(t) = A_\alpha\tau_{\alpha,1}(1-\exp(-t/\tau_{\alpha,1})) + B_\alpha\tau_{\alpha,2}(1-\exp(-t/\tau_{\alpha,2})) + \upsilon_0$$

In said equation, the initial speed $\upsilon_0$ of the vehicle is added to the predicted increases or decreases in speed at the respective measurement times.

Using the function rules obtained for the expected speed and/or for the expected bearing angle, the numerical integration 16 is performed in accordance with the above-mentioned integral for the prediction result $X_{pre}(t)$. This integration takes into account both rotational and longitudinal changes for non steady-state travel states. In exemplary embodiments that are not shown, according to the invention, function rules are determined in linear models for specific travel states, while other travel states are assumed to be constant. This can reduce the time and cost involved in acquiring measured values.

Figure 3:
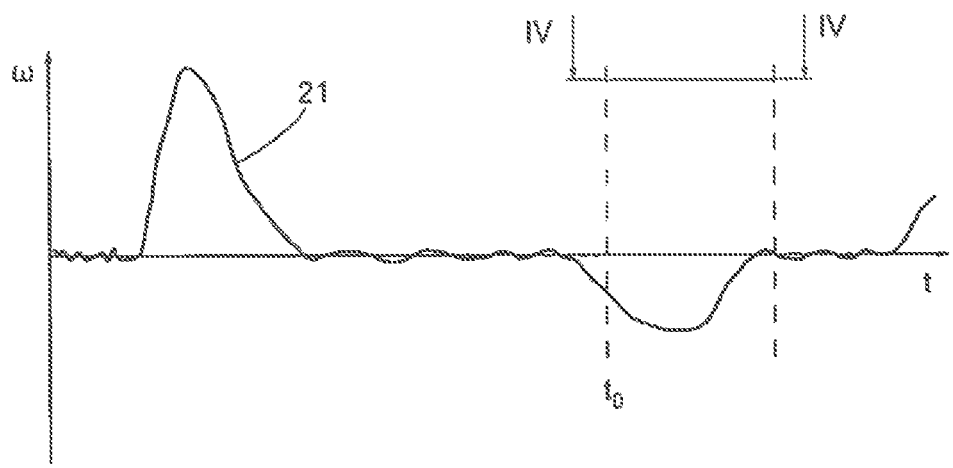
FIG. 3 is a graph of the variation over time of the yaw rate.
Figure 4:
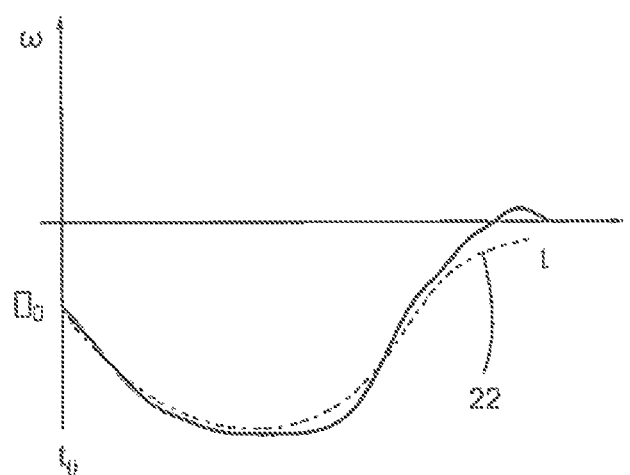
FIG. 4 shows a detail for the interval IV-IV in FIG. 3.

FIG. 3 shows a variation over time of the yaw rate $\omega$. It is clear from this figure that the yaw rate $\omega$ for travel in a straight line is substantially constant and almost no angular movements occur in the vehicle. Changes in the yaw rate $\omega$ arise, for example, from travelling around a bend, which manifests itself as a positive peak 21. In the time interval IV-IV, which is shown magnified FIG. 4, the vehicle is travelling around a right-hand bend, which manoeuvre manifests itself as a negative peak in the yaw rate $\omega$.

The peaks in the yaw-rate curve are considered as isolated from one another in time. Over prolonged time periods, the yaw-rate signal always decays back to zero. The shape of the peaks can be approximated by a bell-shaped signal 22. The fact that the yaw rate of the vehicle increases when entering the turn and decreases when leaving the turn produces the common bell-shaped variation of the yaw-rate signal during cornering. Owing to the deflection in the yaw rate $\omega$ being only temporary and following a bell-shaped curve, the response of a second-order dynamic system can be used for predicting the expected travel path.

The described approach for predicting the expected travel path that assumes a linear model of order at least two yields significantly more accurate prediction results than conventional prediction algorithms. FIG. 5 shows the expected travel path 14 compared with a conventional travel-path prediction 23 (shown dashed). The conventional travel-path prediction 23 results in a course for the predicted travel path that has a considerably narrower radius of curvature because it does not take into account the effect of changes in the travel state during non steady-state phases. The predicted travel path 14 according to the invention, which assumes a linear dynamic model of order two or higher, takes into account dynamic changes in the travel state during the prediction interval. Thereby in particular even those driver assistance systems that work cooperatively, i.e. take into account the movement of destination vehicles 24, can determine more accurate and realistic evasion scenarios.

The invention claimed is:

1. A method for controlling a moving vehicle by numerical integration of a dynamic vehicle model using at least one rotational travel state, which is affected by angular motion of the moving vehicle, and at least one longitudinal travel state, which is affected by linear motion of the moving vehicle, the method comprising:

generating, using at least one sensor of the moving vehicle, measured values corresponding to input variables of the at least one rotational travel state and the at least one longitudinal travel state;

determining time-related function rules for a predicted rotational travel state and/or for a predicted longitudinal travel state;

generating prediction values for a travel state concerned at specific points in time by numerical integration using said time-related function rule; and facilitating control of the moving vehicle based on the prediction values, wherein the time-related function rule of a predicted travel state is determined by:

obtaining respective rotational or longitudinal input variables for at least two time-derivatives of the travel state concerned from the measured values, and relating the input variables in linear dynamic models of order equal to the number of input variables of the travel state concerned using specified time constants, by determining from the linear model a time-related function rule for prediction values for the input variable concerned, and by analytically integrating the function rule for the prediction values of the input variable.

2. The method according to claim 1, wherein variables obtained using the input variables are derived from the linear dynamic model and taken into account as weighting factors in determining the time-related function rules, wherein the weighting factors are updated whenever a new measured value is acquired.

3. The method according to claim 1, wherein measured values are acquired for each input variable.

4. The method according to claim 1, wherein a speed of the vehicle is used as the longitudinal travel state for the numerical integration, wherein as the input variables for the travel-path prediction, the acceleration and a sudden linear movement are determined from the measured values or estimated from the measured values.

5. The method according to claim 1, wherein a bearing angle of the vehicle is used as the rotational travel state for the numerical integration, wherein as the input variables for the travel-path prediction, yaw rate and yaw acceleration are determined from the measured values or estimated from the measured values.

6. The method according to claim 1, wherein the vehicle specified time constants lie in a time range of 0.3 s to 15.0 s.

7. A prediction apparatus for implementing the method as claimed in claim 1, wherein the prediction apparatus comprises a measured-value input for connecting to a vehicle-sensor unit of the vehicle.

8. The prediction apparatus according to claim 7, wherein the prediction apparatus is allocated to a camera-based or optoelectronic driver assistance system or is integrated in such a driver assistance system.

* * * * *